United States Patent [19]

Asawa et al.

[11] Patent Number: 5,088,872
[45] Date of Patent: Feb. 18, 1992

[54] AUTOMATIC EQUIPMENT FOR COLLECTING AND SETTING UP CHAIRS

[75] Inventors: Makoto Asawa, Aichi; Kenji Matuzaki; Kazuo Bando, both of Tokyo, all of Japan

[73] Assignees: Kajima Corporation, Tokyo; Auto Works, Ltd. Kanto, Kanagawa, both of Japan

[21] Appl. No.: 416,715

[22] Filed: Oct. 3, 1989

[51] Int. Cl.$^5$ .............. B60P 3/42; B65G 57/14; B65G 57/32; B65G 59/10
[52] U.S. Cl. .................... 414/352; 198/520; 198/801; 414/331; 414/338; 414/502; 414/528; 414/679; 414/788.2; 414/789.2; 414/793.7; 414/795.6; 414/798.4
[58] Field of Search ............. 414/331, 338, 352, 501, 414/502, 525.1, 528, 679, 788.2, 789.7, 793.7, 795.6, 797.6, 798.4; 198/681, 801, 520

[56] References Cited

U.S. PATENT DOCUMENTS

| 3,655,013 | 4/1972 | Weller | 198/726 X |
| 4,597,706 | 7/1986 | Michit | 414/528 X |

FOREIGN PATENT DOCUMENTS

| 63-252105 | 10/1988 | Japan . | |
| 63-270006 | 11/1988 | Japan . | |
| 1-150633 | 6/1989 | Japan | 414/795.6 |

Primary Examiner—Robert J. Spar
Assistant Examiner—Janice Krizek
Attorney, Agent, or Firm—Koda and Androlia

[57] ABSTRACT

Automatic collection and set up equipment for chairs, characterized by the fact that it performs automatically all the jobs required in collecting and setting up chairs; markedly reduces the man-hours required to prepare a conference room; and it has an arrangement of many hooks which are able to move up or down at short intervals, in line, on a truck picking up or letting down crossmembers of the chairs and stacking chairs one by one.

2 Claims, 9 Drawing Sheets

AUTOMATIC EQUIPMENT FOR COLLECTING AND SETTING UP CHAIRS

BACKGROUND OF THE INVENTION

1. Field of the Invention

This invention relates to automatic equipment for collecting and setting up chairs, enabling the efficient set up and collection of many chairs in a large conference room or gymnasium.

2. Prior Art

Since many chairs must be set up when a gymnasium, exhibition hall or large conference room is to be used for assemblies or ceremonies, many man-hours are required to set up folding chairs and clear them away after an assembly is over. In order to simplify these tasks, stacking chairs 1, shown in FIGS. 15 and 16, which can be stacked, have been used in some cases of prior art, and have been put one at a time vertically on a handcart type rack 2 with caster wheels 2a supporting its base as shown in FIG. 19. Although many chairs 1 can be carried at one time using these handcart type racks 2, manpower is still required to load and unload chairs 1 on and off rack 2. In particular, with a large number of chairs, the loading and unloading position becomes high, making the jobs quite difficult. In addition to the above, moving seating arranged in tiers is sometimes used in large halls. Such seating requires relatively large-scale equipment, making approach to the hall difficult due to the fairly high position of seats at the rear, and its great weight causes damage to the floor of the hall.

SUMMARY OF THE INVENTION

The purpose of the invention is to eliminate problems in the above-mentioned example of prior art and to offer an automatic device for collecting and setting up chairs which performs all the jobs of collecting and setting up of chairs automatically, is compact, needs only one operator, can work and be stored in confined areas since it does not occupy a large floor area.

The invention which achieves the above-mentioned purposes is characterized by many hooks arranged in a line at short intervals movable both upward and downward on a truck, and each hook picks up or puts down a crossmember of a chair which can be stacked.

According to the invention, the moving hooks pick up the chairs one at a time by moving the truck during collection, and the chairs picked up from the lower position are stacked automatically. The reversely moving hooks put down the stacked chairs one at a time by moving the truck during setting up.

BRIEF DESCRIPTION OF THE DRAWINGS

FIG. 7 is the plan view of the second application example;

FIG. 8 is a side view to show chairs hung up;

DETAILED DESCRIPTION OF THE INVENTION

The application examples of the invention will be explained below in detail.

Figure 1:
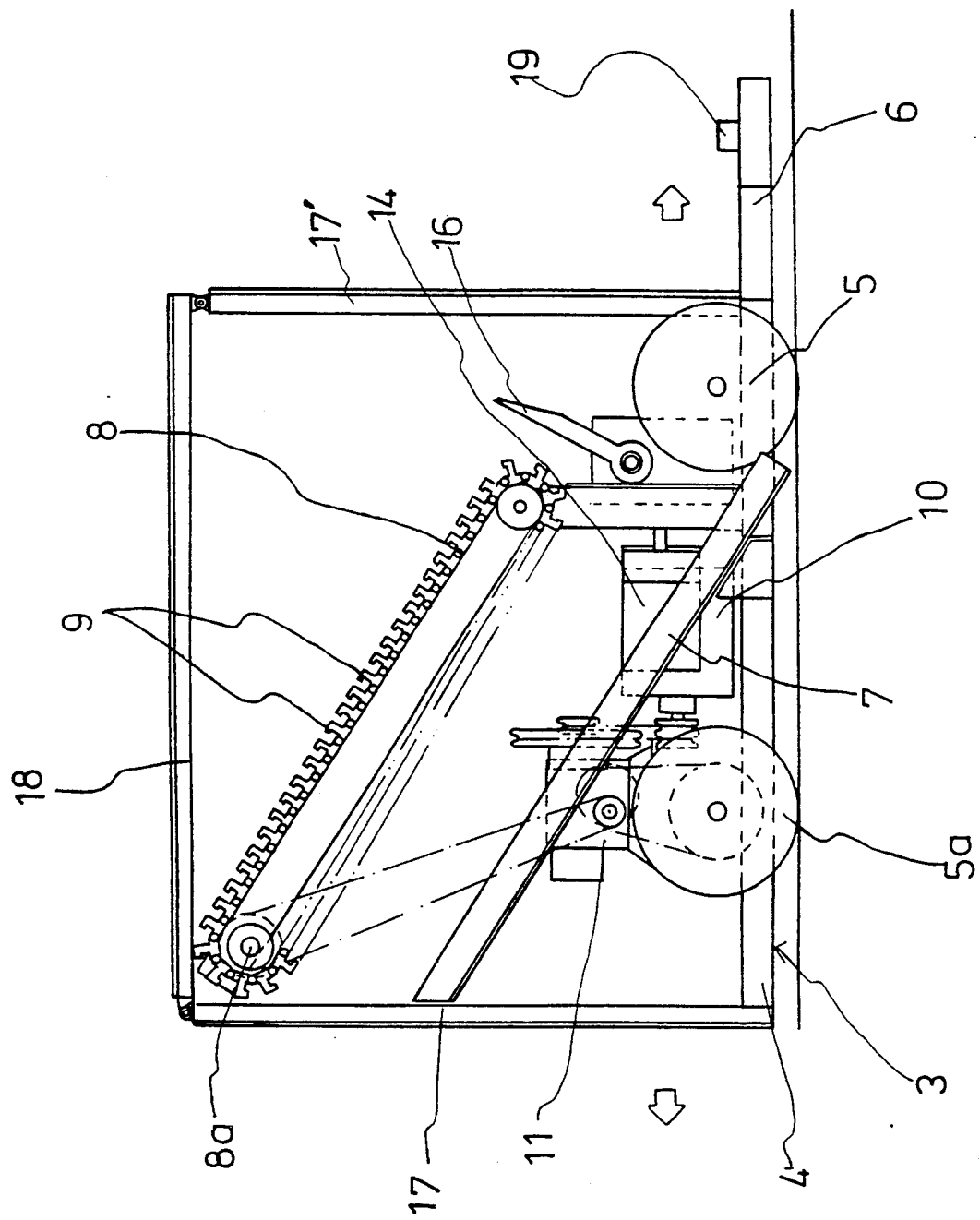
FIG. 1 is a side view of the first application example of the automatic chair collection and set up equipment in the invention.
Figure 2:
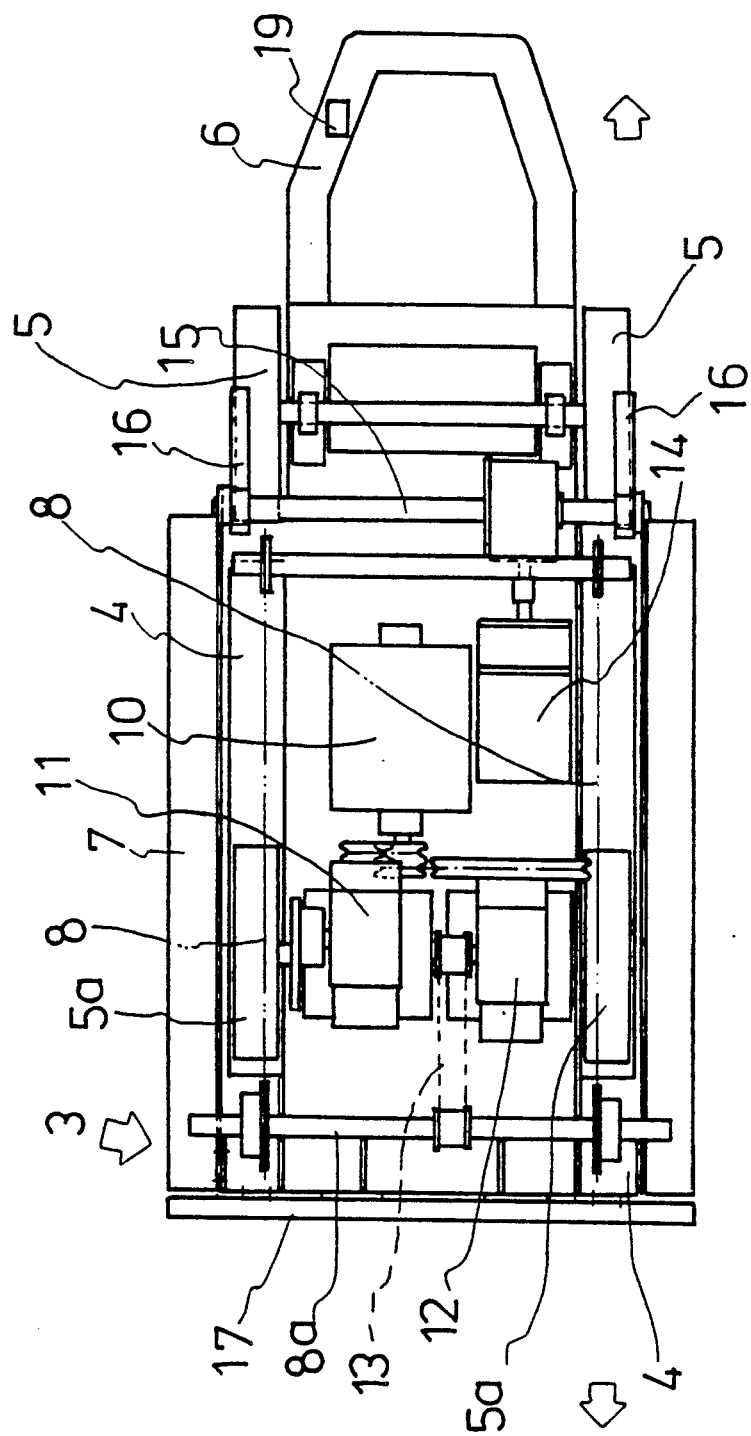
FIG. 2 is a plan view of the first application example.

FIG. 1 is a side view of the first application example of the automatic chair collection and set up equipment in the invention, and FIG. 2 is the plan view in which 3 shows a motor truck consisting of chassis 4 with wheels 5 including driving wheels 5a.

Guide frame 6 is extended rearward horizontally from chassis 4 in truck 3. The width of guide frame 6 is designed so as to be inserted between the legs of below-mentioned stacking chair 1, and its rear section is so tapered as to be easily inserted. Concerning its attachment method to truck 3, guide frame 6 may be designed to that it can be hinged and folded away when not in use.

Figure 6:
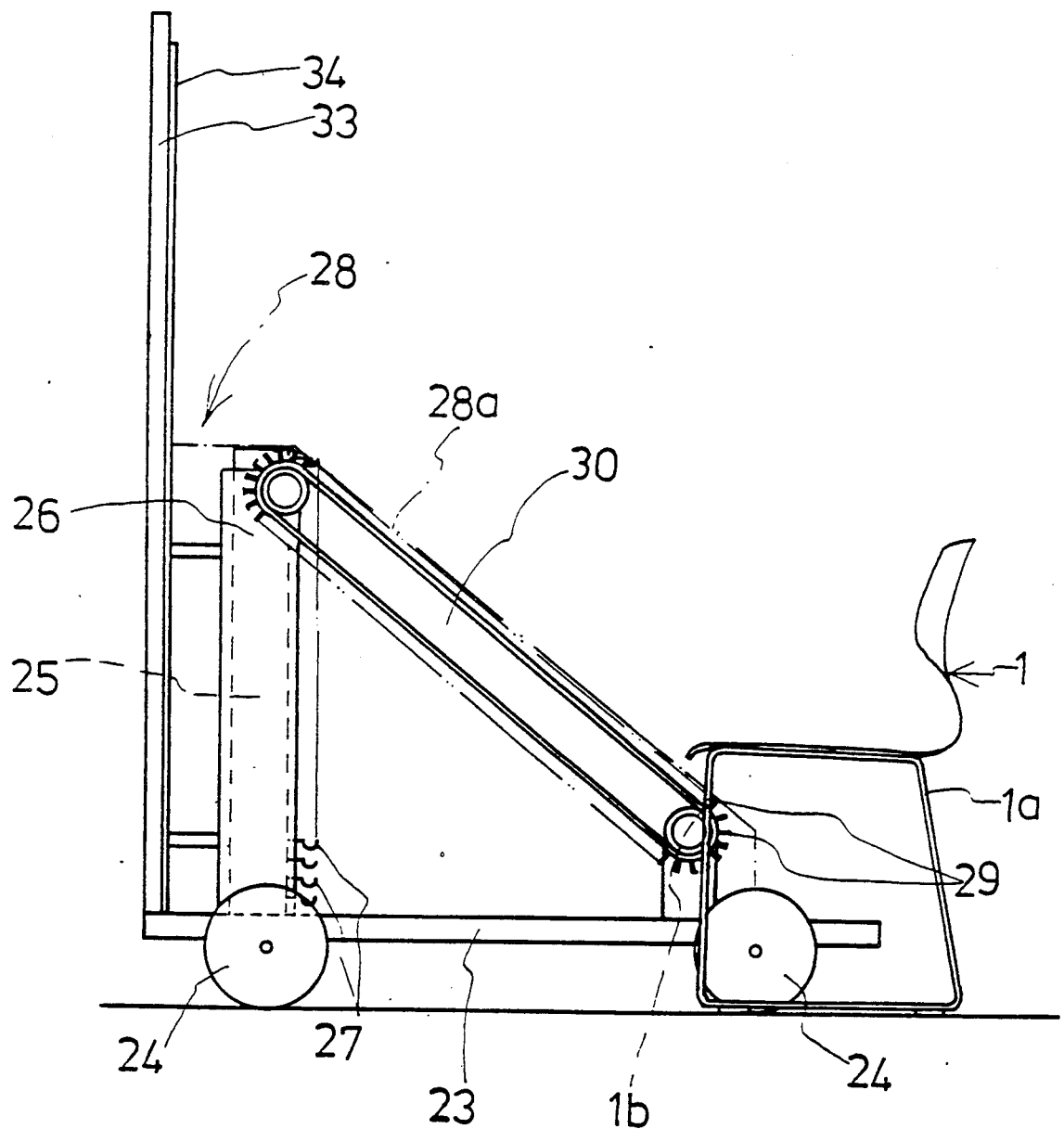
FIG. 6 is a side view of the second application

Two guide rails 7 made of angle-section members arranged in parallel on truck 3 rise upward from one end near the base of guide frame 6. The distance between guide rails 7 is designed to coincide with the distance between legs 1a of the chair, as shown in FIGS. 6 and 7.

Further, lift chains 8, which are endless belts consisting of link chains, are arranged in parallel over guide rails 7. Lift chains 8 have projecting hooks 9 with tips bent like gaffs at each constituent link. The parallel distance between guide rails 7 and lift chains 8 is designed to be the same as the height from the lowest parts of legs 1a of the chair to the height of crossmember 1b connecting the front parts of legs 1a.

Motor 10 in FIG. 1 is arranged on chassis 4, so as to connect with driving wheels 5a via brake and clutch 11, and is also connected with driving shaft 8a for lift chains 8 via reduction box 12 and transmission means such as chains 13.

Pickup arms 16 on shaft 15 rotated by motor 14 are arranged over the base of guide frame 6, and between guide rail 7 and lift chains 8. The ends of arms 16 pick up chair 1 by cross member 1b, rotate counter-clockwise in FIG. 1, and hang it on the end of lift chain 8.

Lift chain 8 and pickup arms 16 are operated by a controller, which is not illustrated. Chair-detecting sensor 19 can be arranged on guide frame 6.

Side panels 17 and 17', and deck 18 are arranged on truck 3. Deck 18 and rear side panel 17' are hinged to front side panel 17. The upper surface of deck 18 is finished for use as a table.

Although motor 10 is commonly used for driving of the truck and driving of the lift chain in this application example, two motors may be used without a clutch in other application examples.

Next, methods of use and operation will be described.

Figure 15:
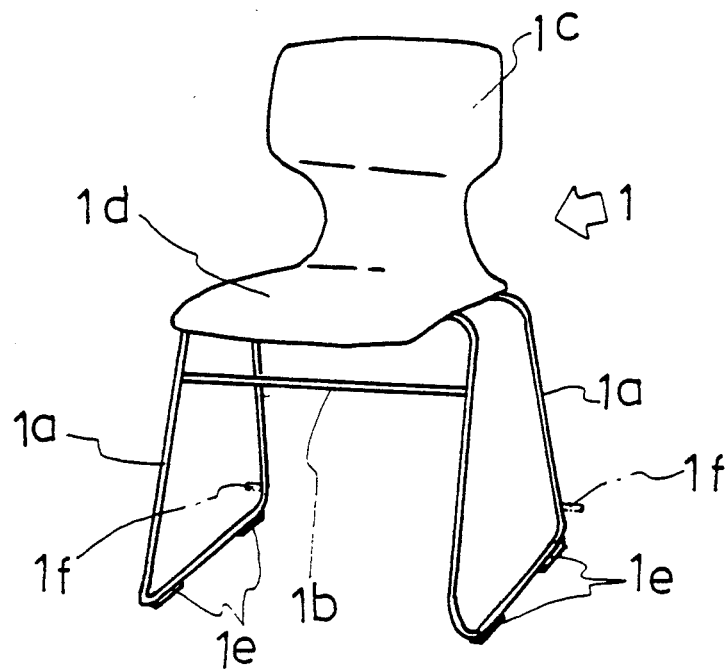
FIG. 15 is a diagonal view of the chair in the fifth application example.
Figure 16:
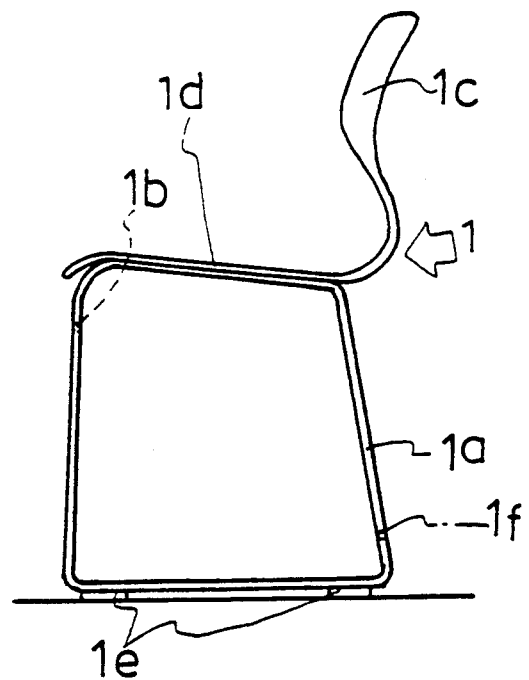
FIG. 16 is the side view of the chair in the fifth application example.
Figure 17:
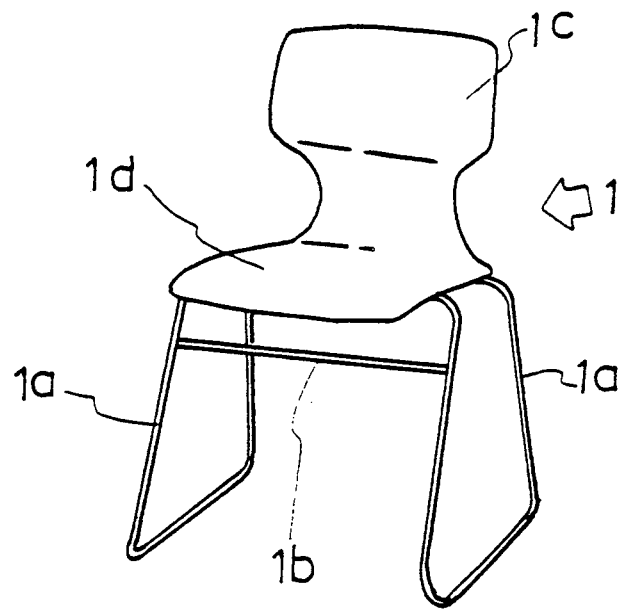
FIG. 17 is a diagonal view of the chair in the first to fourth application examples.
Figure 18:
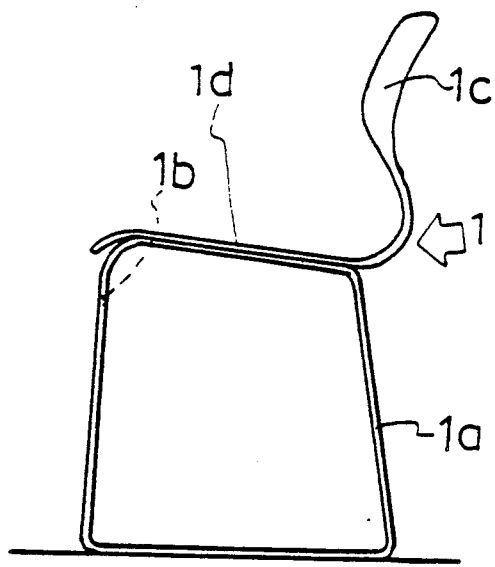
FIG. 18 is the side view of the chair in the first through fourth application examples.
Figure 19:
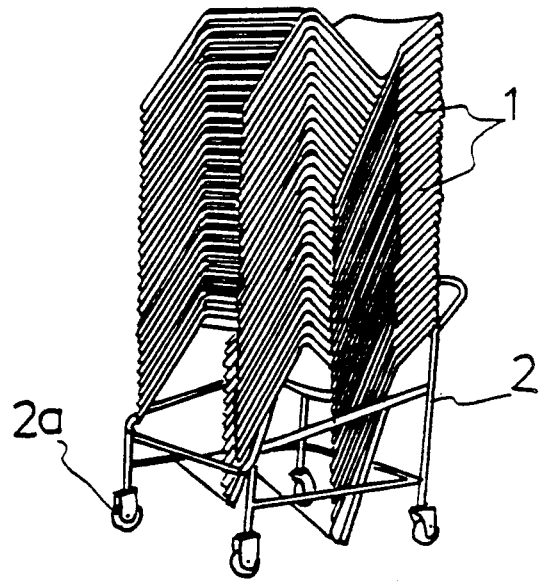
FIG. 19 is a diagonal view of a conventional example.

FIGS. 15 and 16 show chair 1 as an object to be handled automatically in its collection and set up by the equipment in the invention. This is a type of conventional stacking chair; seat back 1c and seat bottom 1d are joined together; legs 1a made of tubing are located at the left and right sides; and crossmember 1b is located at the front of legs 1a. On the bottom surface of each leg 1a, projected parts 1e are attached for stable setting of the chair on the floor.

Figure 5A:
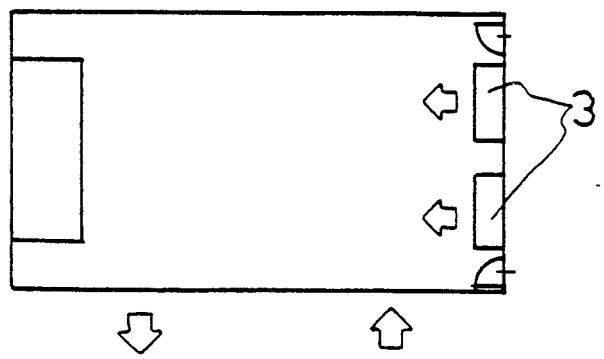
FIGS. 5A, 5B and 5C are floor plans of operation examples.
Figure 5B:
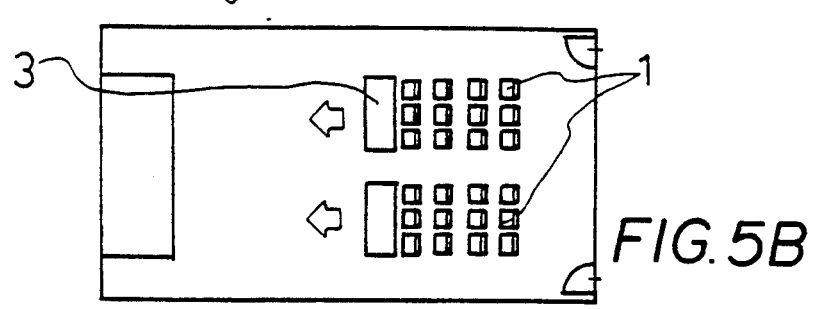
Figure 5C:
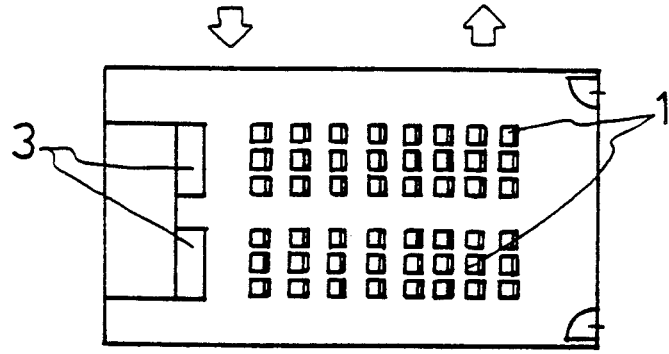

First, a case of collecting chairs 1 set up as shown in FIG. 5C will be explained below.

Figure 3:
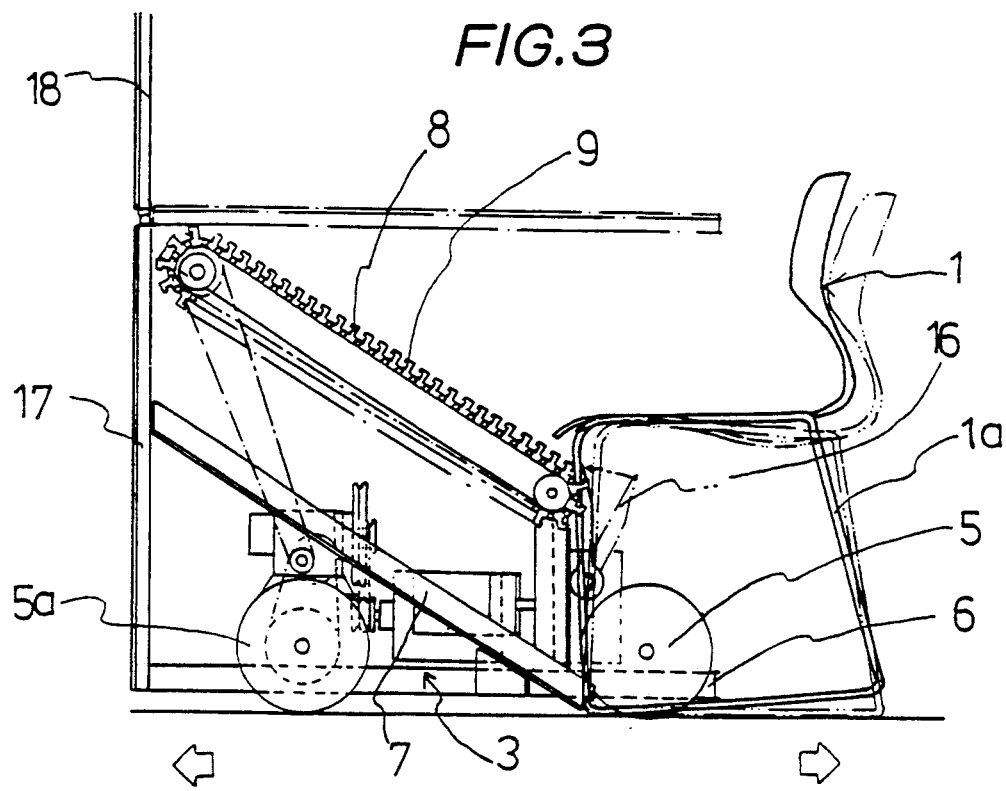
FIGS. 3 and 4 are side views of the first application example which show its operation.

Rear side panel 17' and deck 18 are folded up to keep them out of the way. Driving wheels 5a are rotated by motor 10 and move truck 3 rearward; guide frame 6 is inserted between legs 1a of set up chair 1. When chair-detecting sensor 19 determines that chair 1 has reached the prescribed position, motor 14 begins to rotate, and rotates pickup arms 16 counter-clockwise via shaft 15 making arms 16 pickup crossmember 1b of chair 1. Chair 1 moves onto truck 3; the lower parts of legs 1a ride on guide rails 7; and crossmember 1b is hung on one of the hooks 9 of lift chain 8, as shown in FIG. 3. Then, lift chain 8 is moved one pitch-length by motor 10, and chair 1 is pushed up onto guide rails 7. After one chair has been collected as mentioned above, truck 3 is moved further to collect the next chair in a similar fashion.

Figure 4:
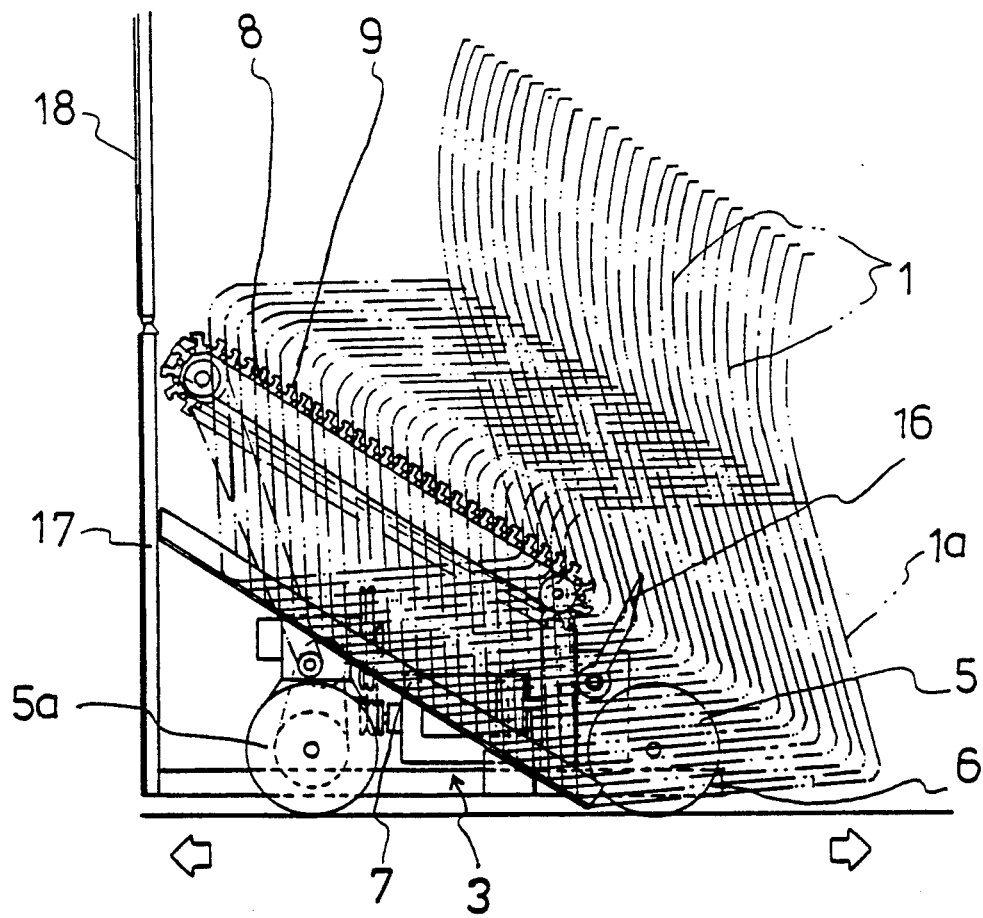

Lift chain 8 is moved by one pitch-length each time a chair 1 is collected; many chairs 1 can be collected by stacking them on truck 3, as shown in FIG. 4. After the scheduled number of chairs 1 has been collected, truck 3 with folded-up deck 18 and rear side panel 17' can be located at a corner of the room and used as a wall surface, etc., as shown in FIG. 5A.

Next, the setting up of chairs 1 is performed by reversing the operations for the above-mentioned collecting. That is: truck 3 is moved forward; lift chain 8 is moved in reverse; and collected chairs 1 can be dropped one at a time at the prescribed location. Since chairs 1 are stored on a slope on guide rails 7, they can be smoothly pushed out just by moving lift chains 8. After the prescribed number of chairs 1 has been set up, deck 18 and rear side panel 17' are returned to the original state, and truck 3 is placed at the front of the room, etc., to use as a table as shown in FIG. 5C.

FIGS. 6 and 7 show the second application example, where 23 is a truck with wheels 24. Truck 23 is either a powered type with motor or handcart type without a driving mechanism. Many hooks 27 are arranged at short intervals in a line on bar 25 on truck 3, and bar 25 is designed to move up or down vertically. 26 is a supporting holder for bar 25, and bar 25 as mounted on holder 26, can slide freely. Hooks 27 jut out from vertical slits in holder 26.

Although figures showing a mechanism moving bar 25 vertically are omitted, there are several types which may be used, such as an oil or air cylinder as a driving source, a motor with gear or chain, a screw-jack mechanism in bar 25 driven by a motor or a manual handle, etc.

Bar 25 is located at the low center position on the front of truck 23, and echelon-shaped guide plates 28 are arranged vertically on truck 23 in parallel at both sides of bar 25. The distance between guide plates 28 is smaller than the width between legs 1a of stacking chair 1, and the height of the tops of guide plates 28 coincides with or approaches closely to the height of the upper most hook 27 on bar 25 which is completely confined to holder 26. Lifts 30, which consist of an endless loop such as a link chain or belt with projecting hooks 29, are arranged along inclined side 28a of guide plate 28. Front panel 33 is located at the front of truck 23, and sliding plate 34 is located at the rear of front panel 33.

Next, the method of use will be explained.

First, the collection operation of chairs 1 already set up in a room will be explained.

When truck 23 moves, and the ends of guide plates 28 are inserted between legs 1a of chair 1, crossmember 1b touches inclined side 28a of guide plates 28. When lift 30 is driven in this situation, the endless belt rotates and hook 29 moves and grasps crossmember 1b and pushes it up along inclined side 28a of guide plate 28 by the movement of the endless belt.

When chair 1 rises along guide plate 28 and reaches the top of bar 25 mounted in holder 26, hook 27 at the top of bar 25 grasps the middle region of crossmember 1b, and bar 25 rises by one pitch-length and picks up chair 1. The next chair 1 is then similarly pushed up by lift 30 along guide plate 28, is picked up by the next hook 27 of bar 25; bar 25 picks up many chairs 1 during its gradual rise by stacking them. The front lower parts of legs 1b of chair 1 always touch sliding plate 34 during the operation to ensure stable conditions. When many chairs 1 have been collected by hanging up as described above, truck 23 with its load may be stored out of the way.

Next, the set up of many chairs 1 collected on truck 23 is performed by reversing the operations for the above-mentioned collecting. That is: lift 30 is moved in reverse and bar 25 is lowered one pitch-length at a time, and chairs 1 can be placed one at a time on the floor at the prescribed locations, beginning with the lowest chair 1.

Figure 9:
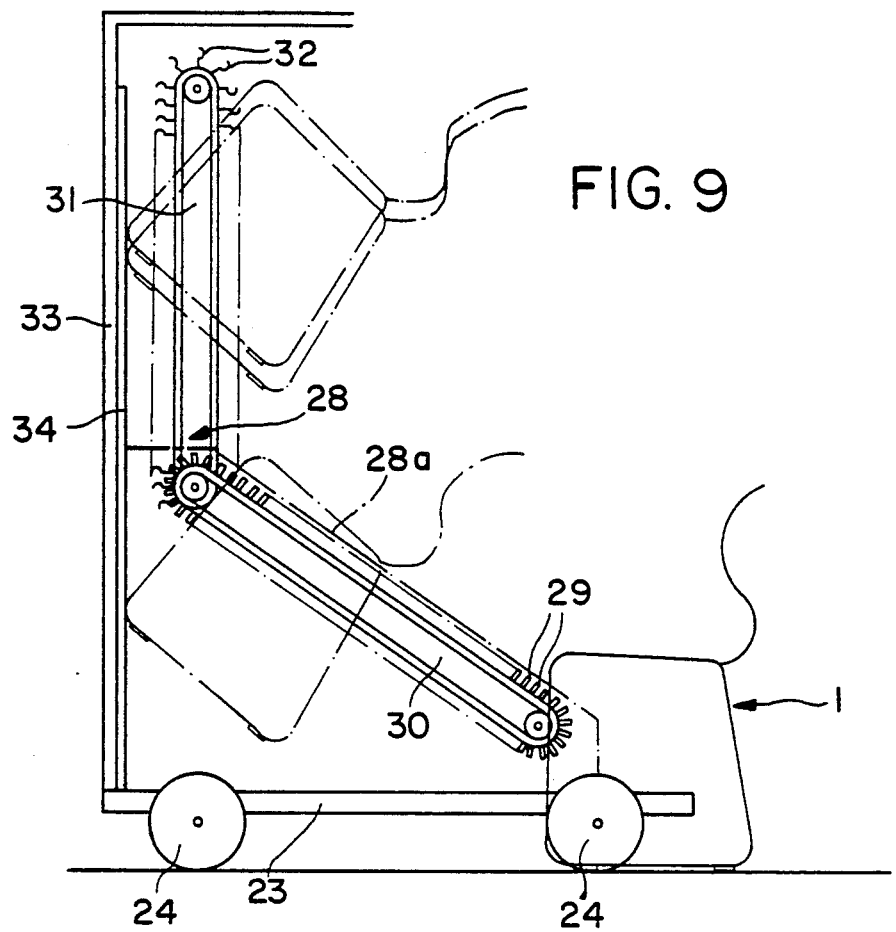
FIG. 9 is a side view of a third application example.

FIG. 9 shows the third application example of the equipment, in which the vertical lift chain is installed instead of movable bar 25, and hook 32 projecting from constituent link of lift chain 31 picks up and collects chairs 1.

In addition, a telescopic arm mechanism can be used to push up chairs 1 along guide plate 28 for both the second and third application examples, instead of the endless belt type lift 30 or chain 31. In the telescopic arm mechanism, a rotating telescopic arm which has a hook at its end is incorporated, and chair 1 is picked up by the hook and lifted upward by contraction of the arm.

Figure 10:
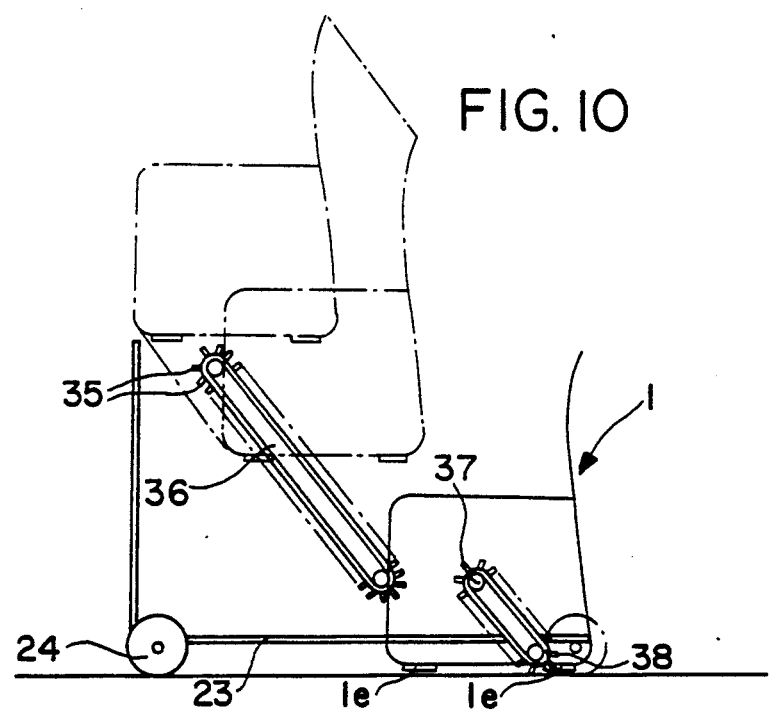
FIG. 10 is a side view of the fourth application
Figure 11:
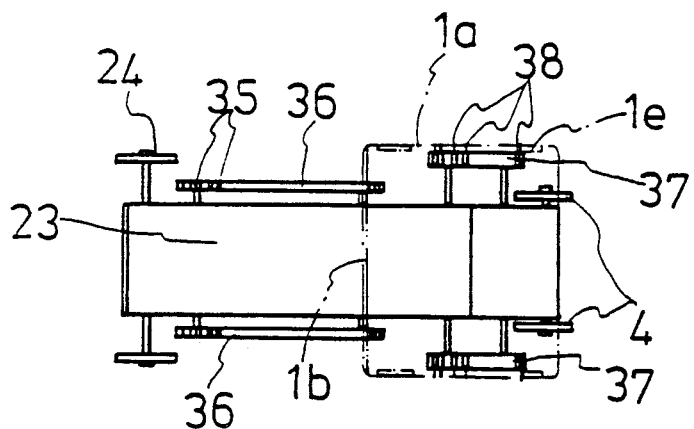
FIG. 11 is the plan view of the fourth application example.

FIGS. 10 and 11 show the fourth application example. Two inclined lift chains 36 with numerous hooks 35 projecting from each constituent link are arranged in parallel on truck 23, and two small lift chains 37 are arranged in parallel with lift chains 36, where the height of the lower rotating center of lift chains 36 coincides with that of the upper rotating center of lift chains 37. Lift chains 37 have small outward projections 38, and the distance between the lift chains is slightly smaller than the distance between legs 1a of chair 1. The relative distance of lift chains 36 is smaller than that of lift chains 37.

Next, the method of use of the equipment will be explained.

One end of truck 23 is inserted between legs 1a of chair 1 to collect a set up chair 1. Crossmember 1b of chair 1 is picked up by hooks 35 in lift chairs 36 at rest.

Lift chains 37 enter between legs 1a, and small outward projections 38 support the lower surfaces of legs 1a.

When lift chains 36 and 37 are moved one pitchlength at the same speed, chair 1 is lifted slightly by the support of hooks 35 and small projections 38 at crossmember 1b and the lower surfaces of legs 1a, respectively. Similarly, the next chair 1 to be collected is moved under the already collected chair 1 for stacking, and is lifted by the support of the next hooks 35 and small projections 38. Thereafter, chairs 1 are lifted one at a time. When the support of lift chains 37 is terminated at their upper position, the horizontally stacked chairs 1 are stable since they support each other at their seat bottoms.

Next, the setting up of many collected and stacked chairs 1 on truck 23 is performed by reversing the operations of lift chains 36 and 37. Chairs 1, beginning from the lowest, can be dropped one at a time at the prescribed location.

Figure 12:
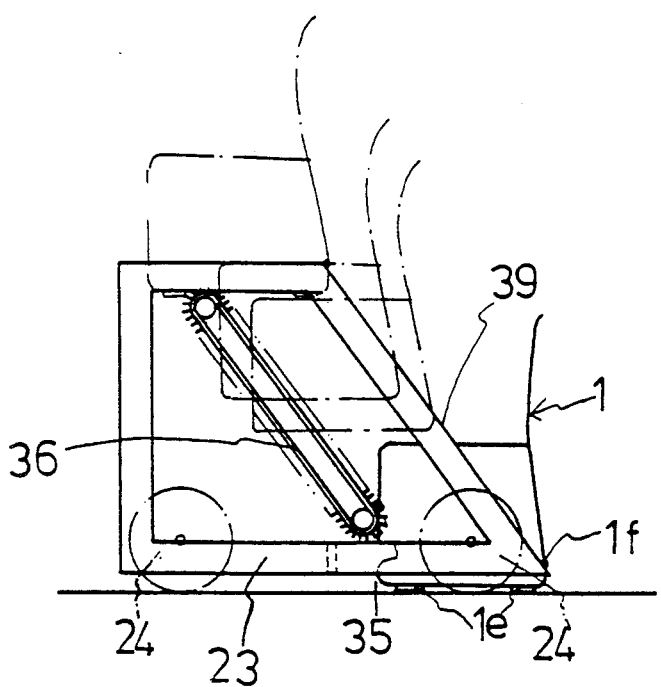
FIG. 12 is a side view of the fifth application
Figure 13:
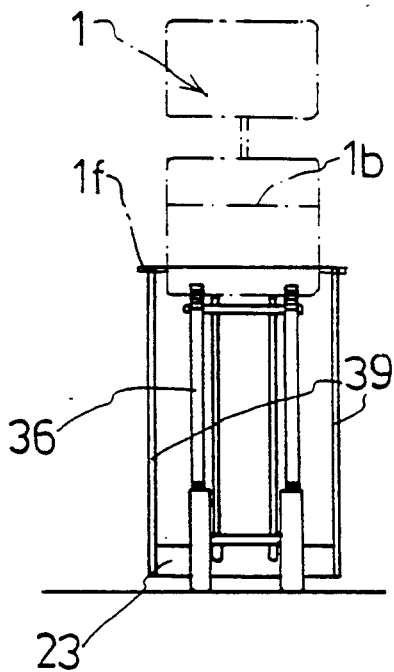
FIG. 13 is a rear view of the fifth application example.
Figure 14:
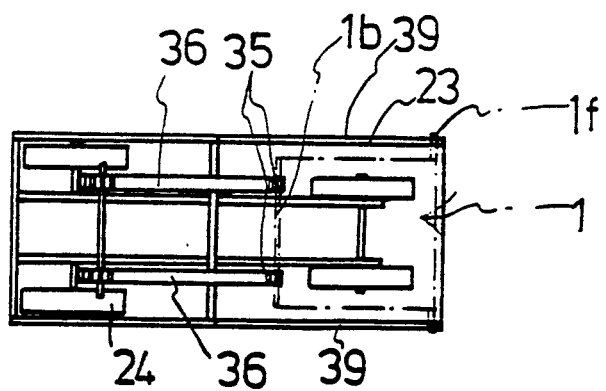
FIG. 14 is a plan view of the fifth application example.

FIGS. 12, 13, and 14 show the fifth application example. Although lift chains 36 are arranged on truck 23 similarly to the fourth application example, two guide frames 39 are arranged in parallel on truck 23 with the same inclination as lift chains 36 so that their lower ends approach the floor. The relative distance between guide frames 39 is slightly larger than that between legs 1a of chair 1.

Next, the method of use of equipment will be explained.

The application chairs 1, slightly different from those used in the above mentioned examples, have outward horizontal projections 1f near the lower rear corner of legs 1a as shown by dotted lines in FIGS. 15 and 16.

One end of truck 23 is inserted between legs 1a of chair 1 to collect chair 1. Crossmember 1b is hung up by hooks 35 in lift chains 36, and horizontal projections 1f are raised on guide frames 39. When lift chains 36 are moved by one pitchlength, hooks 35 pick up chair 1 at crossmember 1b, and at the same time horizontal projections 1f slide up on guide frames 39, and chair 1 is picked up, while maintaining its horizontal attitude. The next chair 1 is then similarly picked up by the next hooks 35 under already collected chair 1. As all chairs 1 are collected one at a time and are hung in a vertically stacked condition, they sit on truck 23 in quite a stable state.

Next, the laying of chairs 1 one at a time is performed by reversing the operations of lift chains 36. Chairs 1 slide down one at a time on guide frame 39, and are put down by truck 23 at the prescribed location.

As described above, the automatic chair collection and set up equipment in the invention automatically performs all the collection and set up tasks in a conference room, and can markedly reduce man-hours required for preparation of a conference setting. The equipment used is very light in weight and compact in size, can be operated by only one man without, any damage to the floor, can be stored in a small part of the room without taking up room space, and is convenient for assuring a storage place for chairs. Furthermore, parallel arrangement of the equipment and its simultaneous operation enables the handling of many more chairs.

We claim:

1. An apparatus for automatically collecting and setting up chairs comprising:
   a truck;
   a horizontal guide frame projected rearward from a chassis of said truck said guide frame being able to enter between legs of chairs to be collected;
   a pair of parallel guide rails provided in said truck, said guide rails rising upward from one end thereof which is near a base of said guide frame to the other end thereof;
   a pair of parallel lift chains provided between guide rollers and drive rollers, said lift chains being parallel to and above said guide rails and made up of endless link chains which are comprised of links having hooks, said hooks projecting outwardly so that spaces between hooks become larger when said link chains are around said drive rollers and guide rollers and the tip end of each of said hooks being bent like gaffs; and
   pickup arms provided in front of said lift chains so that said pickup arms engage with the crossmember of said chair.

2. An apparatus for automatically collecting and setting up chairs comprising:
   a truck;
   a horizontal guide frame projected rearward from a chassis of said truck, said guide frame being able to enter between legs of chairs to be collected;
   a pair of parallel guide rails provided in said truck, said guide rails rising upward from one end thereof which is near a base of said guide frame to the other end thereof;
   a pair of parallel lift chains being parallel to and above said guide rails and made up of endless link chains which are comprised of links having hooks, said hooks projecting outwardly so that spaces between hooks become larger when said link chains are around said drive rollers and guide rollers and the tip end of each of said hooks being bent life gaffs; and
   pickup arms provided in front of said life chains so that said pickup arms engage with a crossmember of said chair and
   side panels and a deck provided on said truck, said deck and one of said side panels being hinged so as to be folded up so that when said chairs are collected said deck and one of said side panels are folded up to create larger space in said truck and when chairs are not stored said deck and one of said side panels are folded down so that said deck can be used as a table top.

* * * * *

UNITED STATES PATENT AND TRADEMARK OFFICE
CERTIFICATE OF CORRECTION

PATENT NO. : 5,088,872
DATED : February 18, 1992
INVENTOR(S) : MAKOTO ASAWA, et al.

It is certified that error appears in the above-identified patent and that said Letters Patent is hereby corrected as shown below:

Title page:

Item: [73] Assignees: Change one of the Assignees' name "Auto Works, Ltd. Kanto" to --Kanto Auto Works, Ltd.--

Signed and Sealed this

Seventeenth Day of August, 1993

Attest:

BRUCE LEHMAN

Attesting Officer

Commissioner of Patents and Trademarks